US006771960B1

(12) United States Patent
Otting et al.

(10) Patent No.: US 6,771,960 B1
(45) Date of Patent: Aug. 3, 2004

(54) METHOD FOR A CELLULAR RADIOTELEPHONE TO SCAN FOR SERVICE FROM ADJACENT CELLS

(75) Inventors: Marcia J. Otting, Mundelein, IL (US); Stephen A. Howell, Gloucester (GB)

(73) Assignee: Motorola, Inc., Schaumburg, IL (US)

( * ) Notice: Subject to any disclaimer, the term of this patent is extended or adjusted under 35 U.S.C. 154(b) by 528 days.

(21) Appl. No.: 09/706,980

(22) Filed: Nov. 6, 2000

(51) Int. Cl.[7] .............................................. H04Q 7/20
(52) U.S. Cl. ...................... 455/434; 455/515; 455/525
(58) Field of Search ................................ 455/437, 436, 455/449, 525, 443, 512, 517, 417, 452.2, 566, 67.11, 432.1, 435.1, 434, 450, 452.1, 524, 515; 370/331, 335

(56) References Cited

U.S. PATENT DOCUMENTS

| | | | |
|---|---|---|---|
| 4,775,999 A | | 10/1988 | Williams ................. 455/435.1 |
| 5,623,422 A | | 4/1997 | Williams ................. 455/67.11 |
| 5,854,981 A | * | 12/1998 | Wallstedt et al. ........... 455/436 |
| 5,915,221 A | * | 6/1999 | Sawyer et al. .............. 455/437 |
| 5,953,665 A | | 9/1999 | Mattila ....................... 455/434 |
| 5,995,834 A | * | 11/1999 | Moore ........................ 455/434 |
| 6,094,581 A | * | 7/2000 | Fried et al. ................. 455/449 |
| 6,295,450 B1 | * | 9/2001 | Lyer et al. .................. 455/417 |
| 6,308,066 B1 | * | 10/2001 | Ranta et al. ................ 455/436 |
| 6,501,951 B2 | * | 12/2002 | Moore ........................ 455/434 |
| 6,546,251 B1 | * | 4/2003 | Dalsgaard et al. .......... 455/437 |
| 6,564,068 B1 | * | 5/2003 | Marsan ....................... 455/525 |
| 2001/0044301 A1 | * | 11/2001 | Moore ........................ 455/434 |
| 2002/0183061 A1 | * | 12/2002 | Moore ........................ 455/434 |

OTHER PUBLICATIONS

GSM 05.08; *Digital cellular telecommunications system (Phase 2+); Radio subsystem link control*; European Telecommunications Standards Institute (ETSI), European Standard (Telecommunications series), v6.7.1.

GSM 06.22, "Digital cellular telecommunications system (Phase 2+); Functions related to mobile station (MS) in idle mode and group receive mode", European telecommunications Standards Institute (ETSI), European Standard (Telecommunications series), v6.2.0.

* cited by examiner

*Primary Examiner*—Charles Appiah
*Assistant Examiner*—Rafael Perez-Guierrez
(74) *Attorney, Agent, or Firm*—Brian M. Mancini

(57) ABSTRACT

A method for a radiotelephone to scan for service in a radiotelephone system having a plurality of carriers within a corresponding geographic area includes establishing (202) a list of a predetermined number of carriers having the strongest signal strengths from cells proximate to the cell where the radiotelephone is camped. A next step includes determining (206) those proximate carriers from the list that are unsuitable for reselection by the radiotelephone. A next step includes scanning (208) for other suitable carriers within the area to substitute for those unsuitable carriers found in the determining step. A next step includes modifying (212) the list to include those suitable carriers found in the scanning step.

16 Claims, 2 Drawing Sheets

METHOD FOR A CELLULAR RADIOTELEPHONE TO SCAN FOR SERVICE FROM ADJACENT CELLS

FIELD OF THE INVENTION

The present invention relates in general to radiotelephone communication systems, and more particularly to a method for a radiotelephone to select service from adjacent cells.

BACKGROUND OF THE INVENTION

The Global System for Mobile Communications (GSM) system requires mobile radiotelephones to monitor adjacent frequencies for the possibility of reselection in case of dropped service. The intent is that the MS decode and synchronize to up to six adjacent carriers, so that the MS has these from which to choose at the time it determines that a reselection to a different carrier is necessary. In recent years there have been a number of new proposals put forth in the GSM standards describing future network features that will allow a network to configure specific carriers so that certain mobile radiotelephone types are prohibited from obtaining service on that carrier. The general direction of these proposals is that specific broadcast data corresponding to a new feature on that carrier allows only new mobile radiotelephone types with the feature enabled to obtain service there. One example of such a feature is a Local Service Area (LSA) which requires a mobile radiotelephone to have a subscription to a specific service area in order to obtain service there. Older mobile radiotelephone types will see the broadcast data as corresponding to an unsuitable carrier, and will not obtain service there. Other suitability criteria include a predefined minimum signal level, accessibility, and a predefined set of specific broadcast information parameters.

However, there is no provision in the GSM specifications for a mobile radiotelephone to select the six adjacent carriers based on the broadcast data of those carriers. The only mechanism in the specifications by which the mobile radiotelephone chooses the adjacent carriers is the relative signal level on the adjacent carriers. For this reason, the list of six adjacent carriers is often referred to as the "six strongest adjacent cell" list, or simply "six strongest". No exceptions are provided to include other carriers on which there is the possibility of obtaining service. As a result, when a mobile station is monitoring the six adjacent carriers, it is possible that in future networks, the mobile radiotelephone will consider some or all of these carriers unsuitable for obtaining service. Thus, when the mobile radiotelephone is required to reselect to one of those carriers, there are limited possible carriers from which to choose. In some circumstances this requires the mobile radiotelephone to take more time and resources to reselect to one of those carriers, thus degrading service quality. Further, monitoring adjacent carriers on which there is no possibility of reselection is a waste of mobile radiotelephone resources.

The current GSM specification (GSM 05.08, "Digital cellular telecommunications system (Phase 2+); Radio Subsystem Link Control", (European Telecommunications Standards Institute (ETSI), European Standard (Telecommunications series), v6.7.1, section 6.6.1.) states the following as required idle mode activities: "The list of the six strongest non-serving carriers shall be updated . . . ", "The MS [mobile station] shall attempt to decode the broadcast control channel (BCCH) data block that contains the parameters affecting cell reselection for each of the six strongest non-serving cell BCCH carriers at least every five minutes.", and "The MS [mobile station] shall attempt to check the BSIC for each of the six strongest non-serving cell BCCH carriers at least every thirty seconds." The current GSM specification also requires the mobile station to use these six strongest carriers as candidates for cell reselection, and require that the carrier chosen for reselection is suitable (GSM 03.22, "Digital cellular telecommunications system (Phase 2+); Functions related to mobile station (MS) in idle mode and group receive mode", European Telecommunications Standards Institute (ETSI), European Standard (Telecommunications series), v6.2.0, section 5.2.2).

There are no provisions for the mobile radiotelephone to eliminate a cell from its list of six strongest adjacent cells based on suitability criteria. In fact, the current specifications forbid it. The problem scenario becomes more critical when considering future networks operating with mobile radiotelephones that are being built and sold today. FIG. 1 illustrates the current mobile radiotelephone behavior in a prior art network of a GSM system, for example. Given an existing system where there is uniform access, all the carrier cells 10–80 provide the same level of service and a mobile radiotelephone is able to utilize those existing services. In this case, all the carriers 10–80 have all the other carriers of the system in their adjacent cell list. A mobile at position x considers carriers 10, 80, 60, 20, 50 and 40 as its six strongest signals. These are monitored regularly for BCCH and base station identity code BSIC data. Leaving carrier cell 70 moving towards position y, the mobile searches and finds carrier 20 suitable (or 10 or 80), for example, and reselects to it. While entering new cells the mobile radiotelephone re-monitors signal strengths of adjacent cells. As a result, the mobile adds carrier 30 to its list and drops the weakest carrier 60. Later, after moving near to position y, the mobile reselects to carrier 30.

In a future network, it can be assumed that a mobile radiotelephone will require different service access. For example, some networks will not provide data services or some local networks will only have private access for subscribers. In the latter case, referring to FIG. 1, it is assumed that cells 20, 40 and 60 do not provide service access to an older mobile unit (i.e., cells 10, 30, 50, 70 and 80 are available). As before, all the carriers 10–80 have all the other carriers in the system in their adjacent cell list. A mobile, starting at position x, again considers carriers 10, 80, 60, 20, 50 and 40 as its six strongest signals. These are again monitored regularly for broadcast control channel (BCCH) and base station identity code (BSIC), but not the availability of service since this is not required in the standard. In this case, carriers 60, 20 and 40 are unsuitable for reselection as they are not available for service. Leaving carrier cell 70 moving towards location y, the mobile desires to reselect to cell 20 and monitors cell 20 for availability of service. At that time, the mobile determines that carrier 20 is unsuitable and reselect to carrier 80 (or 10) after successfully monitoring cell 80 (or 10) for availability of service. After entering a new cell and re-monitoring signal strengths of adjacent cells, the mobile adds carrier 30 to its list of six strongest signals and drops carrier 60. Later, when leaving carrier 80 and moving near to position y, the mobile monitors carrier 30 for data services and reselects to carrier 30 upon finding those services available.

There are several problems with the mobile behavior in the future network as described above. First, the mobile is wasting idle mode resources monitoring three carriers (20, 40 and 60) which are sufficient in signal strength to be considered as part of the "six strongest adjacent carriers list", but are in fact not suitable candidates for reselection.

Secondly, at the time the mobile determines a reselection is necessary (such as when changing cells), there is an additional waste of resources to determine which of the "six strongest" is a suitable carrier on which to obtain service. Finally, note that the destination of the mobile is carrier 30, but the mobile could not initially reselect to carrier 30 because it was not in its list of six strongest signals. The "six strongest" list actually contained three carriers on which service could not be obtained. Therefore, the mobile had to choose the next best carrier, and then a short time later when it was able to drop a carrier from its list and decode carrier 30, it finally reselected to carrier 30. As a result, the mobile wasted decoding time, monitored carriers it could not use, and made decisions at inappropriate times, i.e., times where the mobile is already busy such as when changing cells.

In view of the above, the need exists for a method to allow a mobile unit to provide a list of not only the six strongest adjacent carriers, but also to augment or modify this list to define suitable adjacent carrier candidates that are actually available for reselection. It would also be of benefit to predefine this listing such that the mobile unit need not search for a suitable carrier at the moment while it is changing cells. Additionally, it would prove beneficial to provide this performance improvement with relatively simple hardware and software at little or no additional cost.

DETAILED DESCRIPTION OF THE PREFERRED EMBODIMENT

Figure 1:
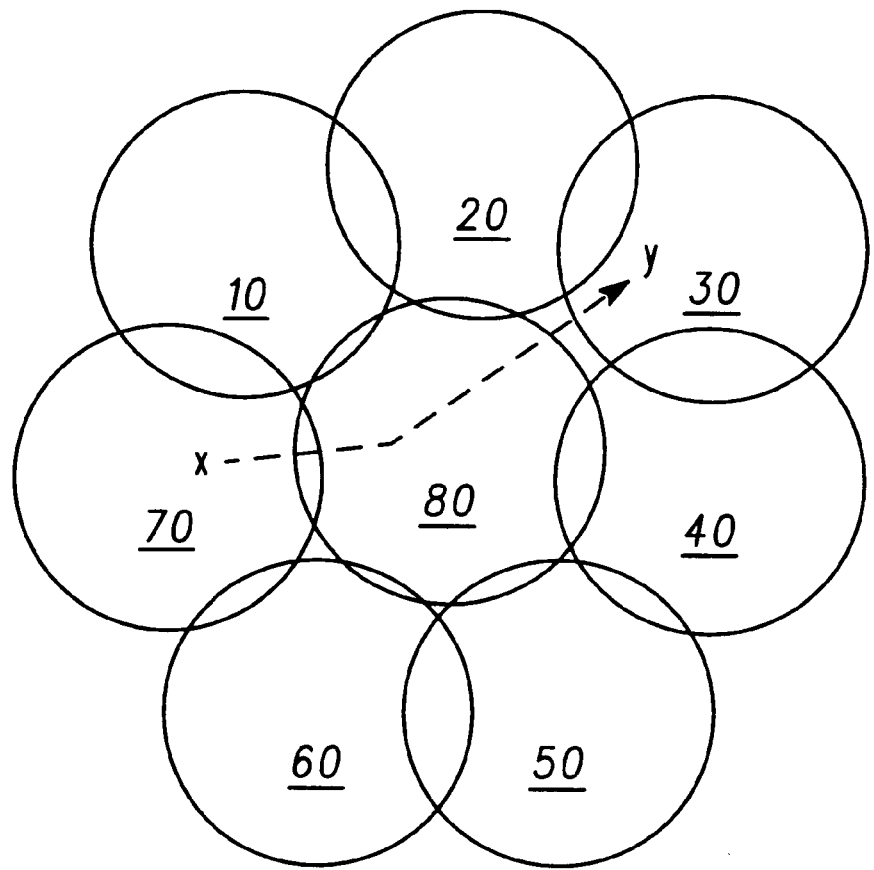
FIG. 1 illustrates a typical cellular communication system, for use in explaining the operation of the present invention.

The present invention provides a method to allow a mobile unit to provide a list of not only the six strongest adjacent carriers, but also to modify or augment this list with suitable adjacent carrier candidates that are actually available for reselection. The method of the present invention also predefine this listing while a mobile is within a cell such that the mobile need not search for a suitable carrier at the moment while it is changing cells. Additionally, the present invention can be implemented with existing hardware and with relatively simple software modification, therefore limiting any cost penalty.

In an existing GSM system, after a mobile radiotelephone is camped within a cell, the mobile is required to search for the six strongest signals from base stations in adjacent cells, in accordance with the GSM standard. In particular, the mobile receives signal strength measurements of the broadcast control channel (BCCH) carriers in a list of BCCH frequencies provided by the GSM system in the current (camped) cell. If no list is available, the last received list of the current cell is used, if available. The mobile also reads parameters affecting cell reselection of the surrounding cells from their respective broadcast control channel carriers. Among these parameters is the associated base station identity code (BSIC) and other service information. The mobile regularly updates this information.

In a first embodiment of the present invention, the mobile unit initially defines a list of the six strongest carriers from adjacent cells. In addition, the mobile uses the BCCH to determine if that particular cell is available to provide service to the mobile. Determining service availability can be accomplished by comparing the BSIC and other information to parameters stored within the mobile. Using the above information, the mobile determines which of the cells in the "six strongest" list are suitable for providing service to the mobile and computes their reselection criterion. If at least one of the six strongest cells are not suitable for reselection, due to lack of one or more suitability criteria, the mobile will deselect that cell from consideration (although keep it on the list) and subsequently augment the list with further available base stations until there are enough potential adjacent base station candidates having available service. These procedures consider whether the adjacent cells can support service for that particular mobile, unlike in the prior art. Furthermore, the mobile decides ahead of time which of the adjacent cells is most suitable, in terms of signal strength, broadcast data and availability, instead of deciding at a cell reselection, as happens in the prior art. This saves time and system resources in that a mobile will not need to determine suitability during a reselection.

In existing standards requirements, the mobile unit is required to monitor and maintain a list of the adjacent cells with the six strongest signals, even if some of those six are not available for service, i.e., are not suitable. In order to maintain a sufficient number of adjacent cells that are viable re-selection candidates, the mobile augments its list of six strongest signals with further base stations, albeit with less strong signals, that provide the required service. Preferably, the mobile maintains a list of six suitable cells, beyond those with the six strongest signals. Of course, this does not require a listing of twelve cells as it is very likely that there is some overlap between these groups. However, it should be recognized that the mobile may not find six viable cells and may end up searching through much more than six or twelve adjacent cells, even if this is unlikely.

Referring to FIG. 1 again, a mobile radiotelephone utilizing the present invention will be described. Assume a mobile radiotelephone that does not subscribe to exclusive access service, for example, and assuming cells 10, 20 and 80 require a subscription to be accessed (i.e., cells 30, 40, 50, 60 and 70 do not require a subscription for access and are freely available). All the carriers 10–80 have all the other carriers in the system in their adjacent cell list. A mobile, at position x, monitors for not only broadcast control channel (BCCH) and base station identity code (BSIC), but also the requirement for a subscription for exclusive access. The mobile again considers carriers 10, 80, 60, 20, 50 and 40 as its six strongest signals. However, as cells 10, 20 and 80 can not be accessed since the mobile does not have a subscription, for example, they are no longer candidates for reselection. The mobile still regularly monitors the broadcast control channel (BCCH) and base station identity code (BSIC) of carriers 10, 80, 60, 20, 50 and 40. However, since there are only four carriers viable for reselection, the mobile now adds carrier 30 to its list as a fifth carrier viable for reselection (plus whatever other sixth viable carrier it can find in the vicinity). As a result, when leaving carrier cell 70 moving towards location y, the mobile can reselect directly to carrier 30. In addition, compared to the previous example of service access under an existing system, the mobile in the present invention determines ahead of time those cells suitable for reselection. As a result, the mobile is able to reselect immediately to carrier 30, saving time as well as resources.

In a preferred embodiment of the present invention, the mobile unit initially defines a list of the six strongest carriers from adjacent cells. In addition, the mobile uses the broadcast data of each carrier to determine if that particular cell offers service for the mobile. The mobile determines which of the cells in the "six strongest" list are suitable for providing services required by the mobile and computes their reselection criterion. If at least one of the six strongest cells are not suitable for reselection, due to non-availability of service, the mobile will deselect that cell from the list and subsequently modify the list with further suitable base stations until there are enough potential adjacent base station candidates having available services. These procedures consider whether the adjacent cells will provide service to the mobile, unlike in the prior art. Furthermore, the mobile decides ahead of time which of the adjacent cells is suitable, in terms of signal strength and available service, instead of deciding at a cell reselection, as happens in the prior art. This saves time and system resources in that a mobile will not need to determine if service is available during a cell reselection.

The preferred embodiment takes advantage of a minor change in standards requirements wherein the mobile unit is no longer required to monitor and maintain a list of the adjacent cells with the six strongest signals, but only those six carriers that provide the available service, i.e. are suitable. In order to maintain a sufficient number of adjacent cells that are viable re-selection candidates, the mobile modifies its list of six strongest signals with further suitable base stations, albeit with less strong signals, that are available for service. Preferably, the mobile maintains a list of six available cells, deleting those stronger carriers that do not allow service access.

Referring to FIG. 1 again, a mobile radiotelephone utilizing the preferred embodiment of the present invention will be described. Again assume a mobile radiotelephone that does not subscribe to exclusive access services, for example, and assuming cells 10, 20 and 80 require a subscription to be accessed (i.e., cells 30, 40, 50, 60 and 70 are freely available). All the carriers 10–80 have all the other carriers in the system in their adjacent cell list. A mobile, at position x, monitors for not only broadcast control channel (BCCH) and base station identity code (BSIC), but also the requirement for a subscription to gain access to service. The mobile again considers carriers 10, 80, 60, 20, 50 and 40 as its six strongest signals. However, as cells 10, 20 and 80 can not be accessed, they are no longer candidate for reselection and are dropped from the list. The mobile now only regularly monitors the broadcast control channel (BCCH) and base station identity code (BSIC) of carriers 40, 50 and 60. Further, the mobile now adds carrier 30 to its list as a carrier viable for reselection (plus whatever other two viable carriers it can find in the vicinity). As a result, when leaving carrier cell 70 moving towards location y, the mobile can reselect directly to carrier 30. Compared to the previous example of the first embodiment, the present invention does not waste as many idle mode resources monitoring carriers onto which there is no possibility of reselection. This is in addition to the benefits of the mobile determining ahead of time those cells suitable for reselection, and the ability of the mobile to reselect immediately to carrier 30, saving time as well as resources.

More preferably, to account for duplicate carrier Absolute Radio Frequency Channel Number (ARFCN) numbering in border areas, a further algorithm as part of the method of the present invention will periodically check the unsuitable carriers to verify that they are still unsuitable and should be kept off the list.

It should be recognized that before the above new features can be implemented on existing networks, it will be important to populate the user base with mobile stations that will behave intelligently once those new features are added to the network. Without this feature, existing mobile units in the marketplace when new network features are added will have limited possibilities for reselection, and will waste resources monitoring unsuitable carriers for reselection.

Figure 2:
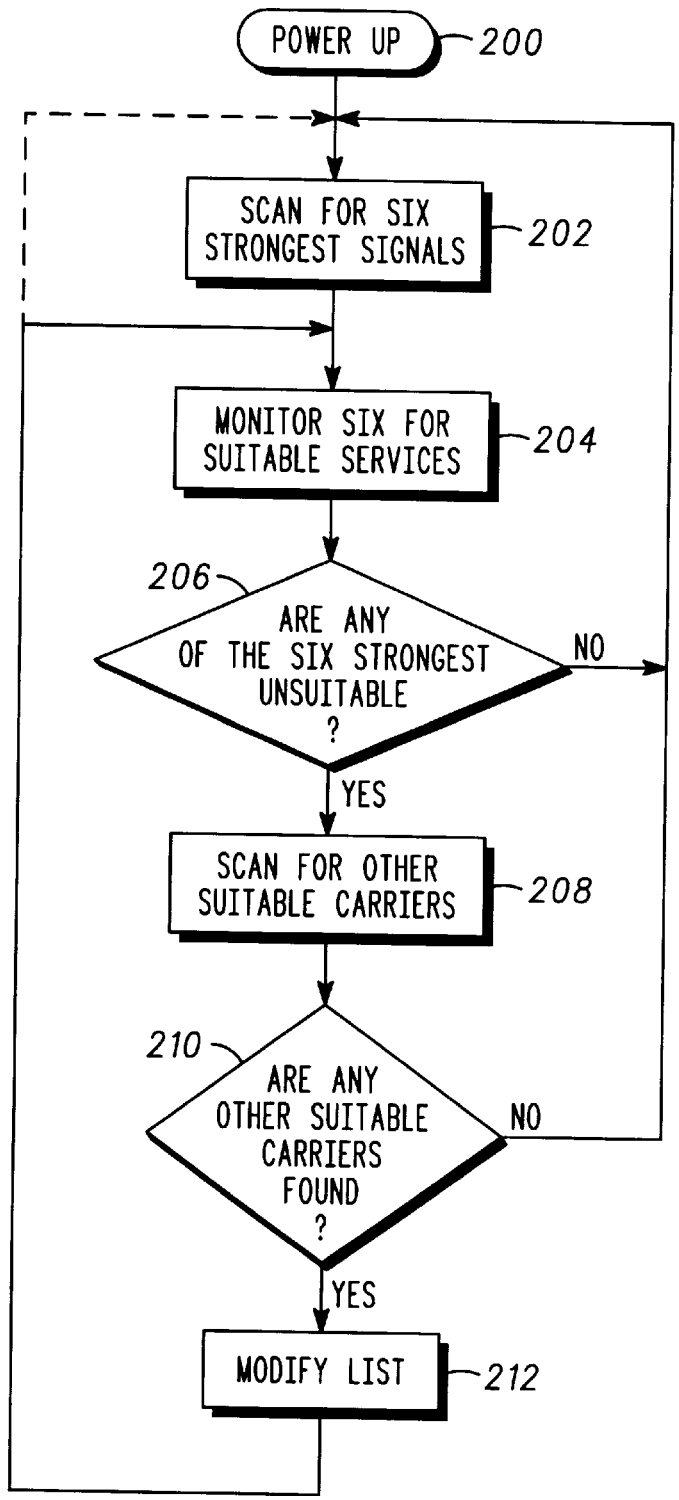
FIG. 2 illustrates a flow diagram of a method in accordance with the present invention.

The preferred embodiment of the method of the present invention can be further understood with reference to FIG. 2. After power up 200, the mobile radiotelephone proceeds to scan 202 for the six strongest signals from adjacent cells and places these six on a list. At the same time or subsequent to this, the mobile monitors 204 the six for availability of service. The mobile determines 206 which of the six are available for service, i.e., are suitable for reselection. If the six carriers are all available for service, the mobile continues its regular scanning for signals. However, if any of the six are unsuitable, the mobile unit scans 208 for other carriers that are available for service. If the mobile does not find any other suitable carriers the mobile returns to its regular scanning for signals. However, if the mobile finds 210 any other suitable carriers, it modifies 212 the list of carriers. In the first embodiment, the list is augmented with those suitable carriers and the mobiles continue to scan for the six strongest signals in addition to those carriers augmenting the list to provide six total carriers suitable for reselection. In the preferred embodiment, any unsuitable carriers are dropped from the list and only those suitable carriers are regularly scanned. More preferably, the mobile periodically rescans all available carriers for suitability.

Specifically, the present invention is a method for allowing a radiotelephone to scan for available service in a radiotelephone system wherein each radiotelephone system has a plurality of carriers for providing radiotelephone service to a radiotelephone within a corresponding geographic area. Each carrier provides communication services within a radio coverage area established by fixed site base stations. Initially, it is preferred that the method includes first steps of powering up, registering and camping the radiotelephone on a (preferably GSM) radiotelephone system. The method includes a next step of the radiotelephone scanning for adjacent carriers having the strongest signal strength. A next step includes establishing a list of a predetermined number of carriers having the strongest signal strengths from cells proximate to the cell where the radiotelephone is camped. Preferably, the predetermined number is six. In particular, the mobile radiotelephone reads the BCCH, BSIC data and other information transmitted by each carrier. The mobile can then determine if the carrier is available for service using known reselection criteria stored for that BSIC. Alternatively, the mobile unit can read reselection criteria transmitted by each carrier to determine if service can be obtained from that carrier.

A next step includes determining those proximate carriers from the list that are unsuitable for reselection by the radiotelephone. Preferably, this step is accomplished before the radiotelephone has moved into a proximate cell. A next step includes scanning for other suitable carriers within the area to substitute for those unsuitable carriers found in the determining step. A next step includes modifying the list to include those suitable carriers found in the scanning step. Preferably, this step is accomplished before the radiotelephone has moved into a proximate cell. In a first embodiment, the list is augmented with the suitable carriers. In a preferred embodiment, any unsuitable carriers from the determining step are deleted from the list and substituted with those suitable carriers from the scanning step. A next step is camping upon one of the suitable carriers from the list when the radiotelephone leaves the cell where it is presently camped. A next step includes the subsequent step of returning to the determining step. Alternatively, this step includes the subsequent step of returning to the establishing step so as to periodically remonitor carriers that have already been scanned.

The present invention provides particular advantages in that GSM operators are looking forward to the availability of mobile stations capable of selecting newly introduced services from available network cells in a GSM system. These features will provide a way for operators to introduce new mobile radiotelephone features while minimizing, or even reducing, the impact on their networks. This technology could also potentially be applied to other types of terminals, such as for example, those with W-CDMA or internet capability.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the broad scope of the invention.

What is claimed is:

1. A method for a radiotelephone to scan for service in a radiotelephone system during an idle mode, the radiotelephone system having a plurality of carriers for providing radiotelephone service to a radiotelephone within a corresponding geographic area, each carrier providing communication services within a radio coverage area established by fixed site base stations, the method comprising the steps of:

powering up, registering and camping the radiotelephone on the radiotelephone system;

scanning by the radiotelephone while in idle mode for adjacent carriers having the strongest signal strength;

establishing by the radiotelephone while in idle mode a list of a predetermined number of carriers having the strongest signal strengths from cells proximate to the cell where the radiotelephone is camped, and reading the BCCH and BSIC data transmitted by each carrier;

determining by the radiotelephone those proximate carriers from the list that will allow camping by the radiotelephone by determining in the radiotelephone if the carrier provides service from known reselection criteria stored for that BSIC before the radiotelephone has moved into a proximate cell;

scanning for other carriers that will allow camping within the area to substitute for those carriers found in the determining step that will not allow camping by the radiotelephone before the radiotelephone has moved into a proximate cell;

modifying the list to include those carriers that will allow camping by the radiotelephone found in the scanning step before the radiotelephone has moved into a proximate cell; and camping upon one of the carriers that will allow camping by the radiotelephone from the list when the radiotelephone leaves the cell where it is presently camped.

2. The method of claim 1, further comprising the subsequent step of returning to the determining step.

3. The method of claim 1, further comprising the subsequent step of returning to the establishing step.

4. The method of claim 1, wherein the radio communication system is a GSM system.

5. A method for a radiotelephone to scan for service in a radiotelephone system during an idle mode, the radiotelephone system having a plurality of carriers for providing radiotelephone service to a radiotelephone within a corresponding geographic area, each carrier providing communication services within a radio coverage area established by fixed site base stations, the method comprising the steps of:

powering up, registering and camping the radiotelephone on the radiotelephone system;

scanning by the radiotelephone while in idle mode the BCCH and BSIC of adjacent carriers for the strongest signal strength, and reading the BCCH and BSIC data transmitted by each carrier;

establishing by radiotelephone while in idle mode a list of a predetermined number of carriers having the strongest signal strengths from cells proximate to the cell where the radiotelephone is camped;

determining by the radiotelephone those proximate carriers from the list that will allow camping by the radiotelephone by determining in the radiotelephone if the carrier provides service from known reselection criteria stored for that BSIC;

scanning for other carriers that will allow camping within the area to substitute for those carriers found in the determining step that will not allow camping by the radiotelephone;

modifying the list to include those carriers that will allow camping by the radiotelephone found in the scanning step; and camping upon one of the carriers that will allow camping by the radiotelephone from the list when the radiotelephone leaves the cell where it is presently camped.

6. The method of claim 5, wherein the determining, scanning and modifying steps are performed before the radiotelephone has moved into a proximate cell.

7. The method of claim 5, further comprising the subsequent step of returning to the determining step.

8. The method of claim 5, further comprising the subsequent step of returning to the establishing step.

9. The method of claim 5, wherein the radio communication system is a GSM system.

10. A method for a radiotelephone to scan for service in a radiotelephone system during an idle mode, the radiotelephone system having a plurality of carriers for providing radiotelephone service to a radiotelephone within a corresponding geographic area, each carrier providing communication services within a radio coverage area established by fixed site base stations, the method comprising the steps of:

establishing by the radiotelephone while in idle mode a list of a predetermined number of carriers having the strongest signal strengths from cells proximate to the cell where the radiotelephone is camped, and reading the BCCH and BSIC data transmitted by each carrier;

determining by the radiotelephone those proximate carriers from the list that will allow camping by the radiotelephone by determining in the radiotelephone if the carrier provides service from known reselection criteria stored for that BSIC;

scanning for other carriers that will allow camping by the radiotelephone within the area to substitute for those carriers found in the determining step that will not allow camping by the radiotelephone; and modifying the list to include those carriers that will allow camping by the radiotelephone found in the scanning step.

11. The method of claim 10, wherein before the establishing step, further comprising the steps of:

powering up, registering and camping the radiotelephone on the radiotelephone system; and scanning for adjacent carriers having the strongest signal strength.

12. The method of claim 10, further comprising the subsequent step of camping upon one of the suitable carriers from the list when the radiotelephone leaves the cell where it is presently camped.

13. The method of claim 10, wherein the determining, scanning and modifying steps are performed before the radiotelephone has moved into a proximate cell.

14. The method of claim 10, further comprising the subsequent step of returning to the determining step.

15. The method of claim 10, further comprising the subsequent step of returning to the establishing step.

16. The method of claims 10, wherein the radio communication system is a GSM system.

\* \* \* \* \*